United States Patent
Mishima

(10) Patent No.: US 9,531,919 B2
(45) Date of Patent: Dec. 27, 2016

(54) IMAGE PROCESSING APPARATUS, IMAGE PROCESSING METHOD, AND RECORDING MEDIUM THAT COLOR-CONVERT AN INPUT IMAGE INTO AN OUTPUT IMAGE SUITABLE FOR A COLOR GAMUT OF A PRINTING APPARATUS

(71) Applicant: FUJIFILM Corporation, Minato-Ku, Tokyo (JP)

(72) Inventor: Takahiro Mishima, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/499,738

(22) Filed: Sep. 29, 2014

(65) Prior Publication Data

US 2015/0092205 A1 Apr. 2, 2015

(51) Int. Cl.
*H04N 1/60* (2006.01)

(52) U.S. Cl.
CPC .......... *H04N 1/6058* (2013.01); *H04N 1/6008* (2013.01); *H04N 1/6027* (2013.01); *H04N 1/6052* (2013.01); *H04N 1/6055* (2013.01); *H04N 1/6075* (2013.01)

(58) Field of Classification Search
None
See application file for complete search history.

(56) References Cited

U.S. PATENT DOCUMENTS

| | | | |
|---|---|---|---|
| 6,628,822 B1 | 9/2003 | Nakabayashi et al. | |
| 7,038,713 B1 * | 5/2006 | Matama | H04N 1/60 348/207.2 |
| 7,965,426 B2 | 6/2011 | Hori et al. | |
| 8,478,027 B2 | 7/2013 | Nishikuni et al. | |
| 2006/0227148 A1 * | 10/2006 | Klassen | G09G 5/02 345/593 |

(Continued)

FOREIGN PATENT DOCUMENTS

| | | |
|---|---|---|
| JP | 11-32228 A | 2/1999 |
| JP | 2002051230 A | 2/2002 |

(Continued)

OTHER PUBLICATIONS

Notification of Reasons for Refusal, dated Oct. 13, 2015, issued in corresponding JP Application No. 2013-205485, 12 pages in English and Japanese.

*Primary Examiner* — Christopher D Wait
(74) *Attorney, Agent, or Firm* — Sughrue Mion, PLLC

(57) ABSTRACT

In the image processing apparatus, a color gamut information storage unit stores terminal information, color gamut determination information and color gamut information in association with one another; an input image determination unit determines whether the input image is a standard color gamut image or a non-standard color gamut image based on the color gamut determination information acquired based on the terminal information; and a first color conversion unit converts the input image as determined to be the non-standard color gamut image into an output image suitable for a color gamut of a printing apparatus based on the color gamut information acquired based on the terminal information so that the input image printed by the printing apparatus may be equal in color to the input image displayed on the display unit of the terminal device.

19 Claims, 12 Drawing Sheets

(56) References Cited

U.S. PATENT DOCUMENTS

2009/0273819 A1\* 11/2009 Hanamoto .............. G06T 15/50
                                                    358/500
2012/0008065 A1\* 1/2012 Im ........................ H01L 33/504
                                                    349/62

FOREIGN PATENT DOCUMENTS

| JP | 2004-135125 A | 4/2004 |
| JP | 2006094138 A | 4/2006 |
| JP | 2007-324989 A | 12/2007 |
| JP | 2008141724 A | 6/2008 |

\* cited by examiner

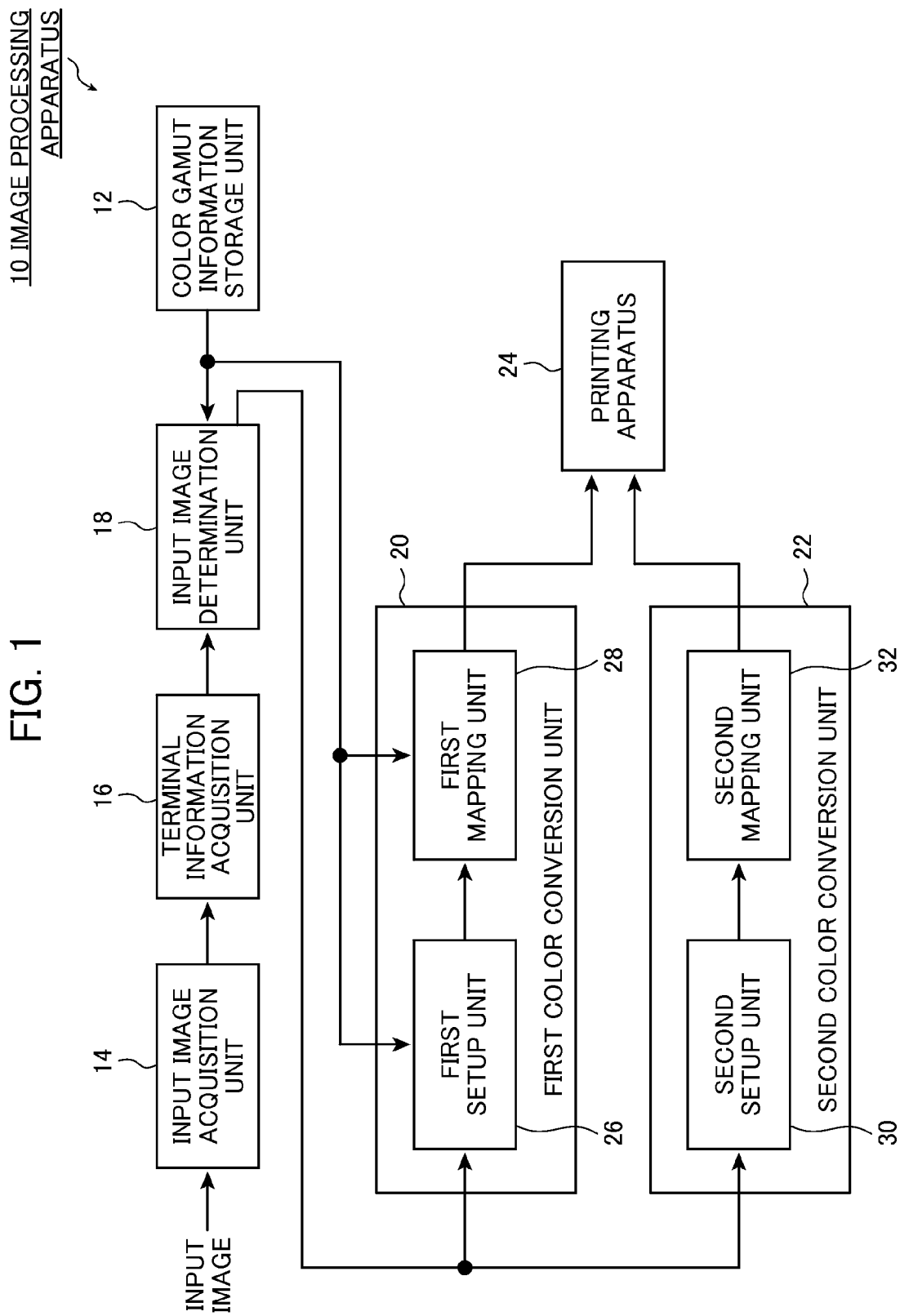

IMAGE PROCESSING APPARATUS, IMAGE PROCESSING METHOD, AND RECORDING MEDIUM THAT COLOR-CONVERT AN INPUT IMAGE INTO AN OUTPUT IMAGE SUITABLE FOR A COLOR GAMUT OF A PRINTING APPARATUS

CROSS-REFERENCE TO RELATED APPLICATIONS

The present application claims priority under 35 U.S.C. §119 to Japanese Patent Application No. 2013-205485 filed on Sep. 30, 2013. The above application is hereby expressly incorporated by reference, in their entirety, into the present application.

BACKGROUND OF THE INVENTION

The present invention relates to an image processing apparatus, an image processing method, and a recording medium that color-convert an input image into an output image suitable for a color gamut of a printing apparatus.

Conventionally, when an image captured by an image capturing device such as a digital camera is printed by a printing apparatus, the image is color-converted into an image suitable for a color gamut of the printing apparatus by an image processing apparatus and then printed by the printing apparatus. In this case, in the image processing apparatus, the image is color-converted into the image suitable for the color gamut of the printing apparatus on the assumption that the image is a standard color gamut image having a standard color gamut in a standard color space such as sRGB or the like.

In recent years, an opportunity to capture and view an image using a terminal device has increased with the spread of terminal devices having a camera function, such as a smartphone or a tablet terminal. However, a color gamut of a display unit of the terminal device does not match a standard color gamut in many cases, and in the case where an image printed by a printing apparatus and an image displayed by the display unit of the terminal device are compared, there is a problem in that colors differ between the images, and a sense of incongruity is caused.

For example, even when user A and user B view the same image on a social network system (SNS) using their terminal devices, colors of the image viewed by user A and colors of the image viewed by user B differ if the terminal devices used by the users differ.

Thus, conventionally, when an image is printed, the image is printed to be an image with standard colors (an image with the emphasis on skin colors, memory colors or grayscale) that is preferred for anyone, but the printed image differs in colors from an image displayed on a display unit of a terminal device of each user.

Prior art literatures relating to the present invention include Patent Literature 1 (JP 2007-324989 A) and Patent Literature 2 (JP 2004-135125 A).

The object of Patent Literature 1 is to satisfactorily reproduce colors in an input-estimated color gamut even when the input-estimated color gamut differs depending on the type of input data source, and ensure color reproduction even with respect to colors other than those in the input-estimated color gamut.

In Patent Literature 1, the input-estimated color gamut is determined in accordance with the type of original (for example, a reflection-type original/positive film/negative film read by a scanner), and a method of compression to a printer color gamut is changed between colors inside the input-estimated color gamut and colors on the outside thereof.

However, in Patent Literature 1, the input-estimated color gamut is switched depending on the type of original read by the scanner and, when a color image is input, the color gamut difference from the device which inputs the color image is not absorbed.

The object of Patent Literature 2 is to perform color conversion suitable for respective images.

In Patent Literature 2, a color conversion table to be used is changed depending on the color tone of an image (monochrome or color).

However, in Patent Literature 2, determination whether an input image is a monochrome image or a color image is merely performed, and it is not possible to change the color conversion depending on a color gamut of a color image.

SUMMARY OF THE INVENTION

The present invention has been accomplished in order to solve the above-described problem in the prior art, and an object thereof is to provide an image processing apparatus, an image processing method and a recording medium capable of color-converting an image so that colors of the image printed by a printing apparatus are the same as those of the image displayed on a display unit of a terminal device.

In order to attain the object described above, the present invention provides an image processing apparatus, comprising:

a color gamut information storage unit configured to store terminal information indicating a type of one or more terminal devices, color gamut determination information indicating whether a color gamut of a display unit of each corresponding terminal device is a standard color gamut or a non-standard color gamut that is not the standard color gamut, and color gamut information indicating a color gamut of the display unit of each corresponding terminal device in association with one another;

an input image acquisition unit configured to acquire an input image;

a terminal information acquisition unit configured to acquire terminal information indicating the type of a terminal device that has input the input image;

an input image determination unit configured to acquire the color gamut determination information stored in association with the terminal information acquired by the terminal information acquisition unit from the color gamut information storage unit based on the acquired terminal information, and determine whether the input image is a standard color gamut image of the standard color gamut or a non-standard color gamut image of the non-standard color gamut based on the acquired color gamut determination information; and a first color conversion unit configured to convert the input image as determined to be the non-standard color gamut image into an output image suitable for a color gamut of a printing apparatus by acquiring the color gamut information stored in association with the acquired terminal information from the color gamut information storage unit based on the acquired terminal information and performing color conversion of the input image based on the acquired color gamut information so that the input image printed by the printing apparatus may be equal in color to the input image displayed on the display unit of the terminal device corresponding to the acquired terminal information.

Also, the present invention provides an image processing method, comprising the steps of:

acquiring an input image by an input image acquisition unit;

acquiring, by a terminal information acquisition unit, terminal information indicating a type of a terminal device that has input the input image;

acquiring, by an input image determination unit, color gamut determination information from a color gamut information storage unit based on the terminal information acquired by the terminal information acquisition unit, with the color gamut determination information indicating whether a color gamut of a display unit of a terminal device corresponding to the acquired terminal information is a standard color gamut or a non-standard color gamut that is not the standard color gamut and being stored in association with the acquired terminal information, so as to determine, by the input image determination unit, whether the input image is a standard color gamut image of the standard color gamut or a non-standard color gamut image of the non-standard color gamut based on the acquired color gamut determination information; and converting the input image as determined to be the non-standard color gamut image into an output image suitable for a color gamut of a printing apparatus by a first color conversion unit which acquires color gamut information from the color gamut information storage unit based on the terminal information acquired by the terminal information acquisition unit, with the color gamut information indicating the color gamut of the display unit of the terminal device corresponding to the acquired terminal information and being stored in association with the acquired terminal information, so as to perform color conversion of the input image based on the acquired color gamut information so that the input image printed by the printing apparatus may be equal in color to the input image displayed on the display unit of the terminal device corresponding to the acquired terminal information.

Also, the present invention provides a non-transitory computer-readable recording medium having a program recorded thereon to cause a computer to execute the respective steps of the image processing method according to above.

In the present invention, it is determined whether the input image is a standard color gamut image or a non-standard color gamut image, and when the input image is determined to be the non-standard color gamut image, color conversion is performed so that colors of the input image printed are the same as those of the input image displayed on the display unit of the terminal device.

Therefore, according to the present invention, a user can print the image having the same colors as those of the image displayed on the display unit of the terminal device of the user, thereby eliminating a sense of incongruity due to the difference in colors between the two images.

BRIEF DESCRIPTION OF THE DRAWINGS

FIG. 1 is a block diagram of a first embodiment illustrating a configuration of an image processing apparatus of the present invention.

DETAILED DESCRIPTION OF THE INVENTION

Figure 2A:
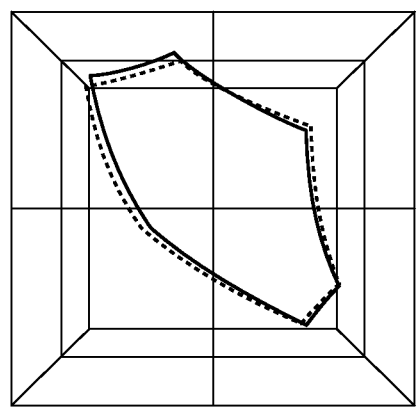
FIGS. 2A and 2B are conceptual diagrams of an example illustrating a color gamut of a display unit of each type of terminal device.

Hereinafter, an image processing apparatus, an image processing method, and a recording medium of the present invention will be described in detail based on preferred embodiments illustrated in the accompanying drawings.

FIG. 1 is a block diagram of a first embodiment illustrating a configuration of an image processing apparatus of the present invention. The image processing apparatus 10 shown in FIG. 1 color-converts an input image into an output image suitable for a color gamut of a printing apparatus 24 and outputs the color-converted image to the printing apparatus 24, and includes a color gamut information storage unit 12, an input image acquisition unit 14, a terminal information acquisition unit 16, an input image determination unit 18, and first and second color conversion units 20 and 22.

The color gamut information storage unit 12 stores terminal information indicating types of one or more terminal devices; color gamut determination information indicating whether a color gamut of a display unit of each corresponding terminal device is a standard color gamut or a non-standard color gamut that is not the standard color gamut; and color gamut information (a device profile such as an International Color Consortium (ICC) profile) indicating the color gamut of the display unit of each corresponding terminal device, in association with one another.

Figure 2B:
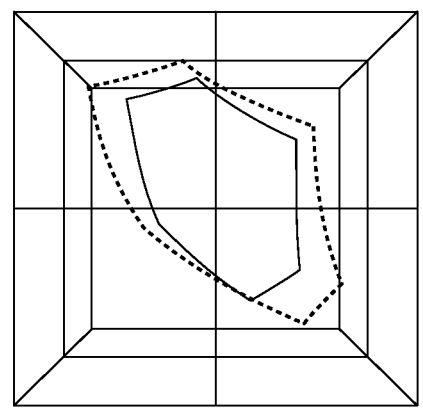

FIGS. 2A and 2B are conceptual diagrams of an example illustrating the color gamut of the display unit of each type of terminal device. In FIGS. 2A and 2B, the inside of an area surrounded by a dotted line indicates a standard color gamut of a standard color gamut image in an L*a*b* color space, and the inside of an area surrounded by a solid line indicates the color gamut of the display unit of the terminal device. The color gamut of the display unit of the terminal device shown in FIG. 2A is substantially the same as the standard color gamut of the standard color gamut image. In contrast, the color gamut of the display unit of the terminal device shown in FIG. 2B is narrower than the standard color gamut of the standard color gamut image.

As shown in FIGS. 2A and 2B, the color gamut of the display unit of the terminal device differs depending on the type (model) of the terminal device. In addition, even in the same model, the color gamut may differ due to individual differences in factors such as a manufacturer or a lot of the display unit mounted on the terminal device.

The color gamut determination information can be determined by comparing a shape and a size of the color gamut of the display unit of each terminal device with a shape and a size of the standard color gamut of the standard color gamut image, based on the color gamut information of the display unit of each terminal device and the standard color gamut information of the standard color gamut image.

The color gamut determination information is determined most simply by a human being making a comparison between the two color gamuts, but, for example, it can also be determined by providing a color gamut determination unit and causing the color gamut determination unit to compare the two color gamuts with each other.

Figure 13:
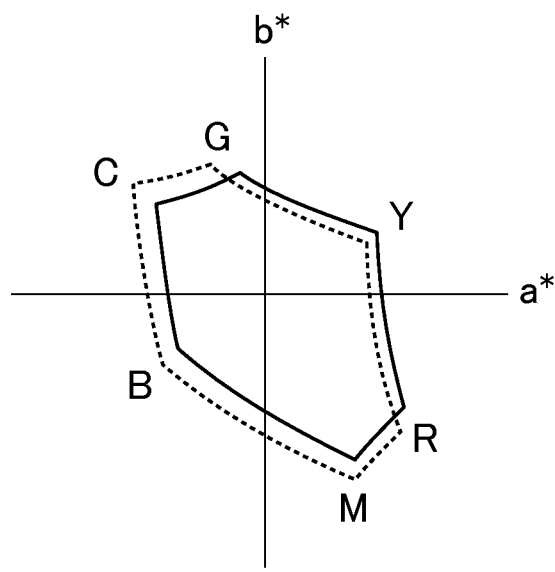
FIG. 13 is a conceptual diagram of an example illustrating a color gamut of a display unit of a terminal device.

FIG. 13 is a conceptual diagram of an example illustrating a color gamut of the display unit of the terminal device. In FIG. 13, the inside of an area surrounded by a dotted line indicates a standard color gamut of a standard color gamut image in an L*a*b* color space, and the inside of an area surrounded by a solid line indicates a color gamut of the display unit of the terminal device.

As illustrated in FIG. 13, a first L*a*b* value of the maximum chroma point of each of CMYRGB (cyan, magenta, yellow, red, green, and blue) in the color gamut of the display unit of each terminal device and a second L*a*b* value of the maximum chroma point of each of CMYRGB in the standard color gamut of the standard color gamut image are compared, and if a difference between the first L*a*b* value and the second L*a*b* value is in a predetermined range (for example, in a range from 95% to 105%), the color gamut determination information can be determined to be information indicating that the color gamut of the display unit of the terminal device is the standard color gamut.

Figure 14:
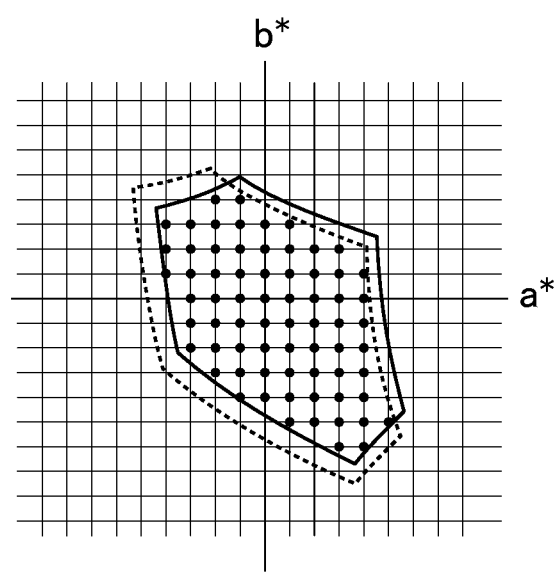
FIG. 14 is a conceptual diagram of an example illustrating a color gamut of a display unit of a terminal device.

FIG. 14 is a conceptual diagram of an example illustrating the color gamut of the display unit of the terminal device. Also in FIG. 14, the inside of an area surrounded by a dotted line indicates the standard color gamut of the standard color gamut image in the L*a*b* color space, and the inside of an area surrounded by a solid line indicates the color gamut of the display unit of the terminal apparatus.

As shown in FIG. 14, the number of first uniform grid points included in the area of the color gamut of the display unit of each terminal device and the number of second uniform grid points included in the area of the standard color gamut of the standard color gamut image are compared, and if a difference between the number of first uniform grid points and the number of second uniform grid points is in a predetermined range (for example, in a range from 95% to 105%, the color gamut determination information can be determined to be information indicating that the color gamut of the display unit of the terminal apparatus is the standard color gamut.

The input image acquisition unit 14 is a unit for acquiring an input image (image data of the input image) input from various devices, including the terminal device.

The terminal information acquisition unit 16 is a unit for acquiring terminal information indicating the type of the terminal device that has input the input image, from supplementary information of the input image acquired by the input image acquisition unit 14.

The supplementary information may be integrally attached to the input image as header information (Exif information) of the input image or may be attached to the input image as information separate from the input image.

In addition, it is not essential for the terminal information acquisition unit 16 to acquire the terminal information from the supplementary information of the input image. For example, in the case of a printing application of the terminal device, the terminal information can be acquired in the application, and in the case of a web printing application, the terminal information can be acquired with javascript (a tracking function). The terminal information acquisition unit 16 may directly receive such terminal information.

The input image determination unit 18 is a unit for acquiring the color gamut determination information, which is stored in association with the terminal information acquired by the terminal information acquisition unit 16, from the color gamut information storage unit 12 based on the acquired terminal information, and determines whether the input image is a standard color gamut image of a standard color gamut or a non-standard color gamut image of a non-standard color gamut based on the acquired color gamut determination information.

When the input image determination unit 18 determines that the input image is a non-standard color gamut image, the first color conversion unit 20 acquires the color gamut information, which is stored in association with the terminal information acquired by the terminal information acquisition unit 16, from the color gamut information storage unit 12 based on the acquired terminal information, and based on the acquired color gamut information, color-converts the input image into an output image suitable for the color gamut of the printing apparatus 24 so that colors of the input image printed by the printing apparatus 24 are the same as those of the input image displayed on the display unit of the terminal device corresponding to the acquired terminal information.

The first color conversion unit 20 includes a first setup unit 26 and a first mapping unit 28.

The first setup unit 26 performs automatic image quality correction processing, such as an automatic exposure (AE) correction, an automatic white balance (AWB) correction, a grayscale correction, a density correction and a tint correction, on the input image based on the color gamut information corresponding to the acquired terminal information.

The first mapping unit 28 color-converts the input image subjected to the automatic image quality correction processing in the first setup unit 26 into an output image suitable for the color gamut of the printing apparatus 24 based on the color gamut information corresponding to the acquired terminal information and the color gamut information of the printing apparatus 24.

When the input image determination unit 18 determines that the input image is a standard color gamut image, the second color conversion unit 22 color-converts the input image into an output image suitable for the color gamut of the printing apparatus 24 so that the colors of the input image printed by the printing apparatus 24 are the same as those of the input image displayed by a standard display device having the standard color gamut, based on the standard color gamut information of the standard color gamut image of sRGB.

The second color conversion unit 22 includes a second setup unit 30 and a second mapping unit 32.

The second setup unit 30 performs automatic image quality correction processing on the input image based on the standard color gamut information of the standard color gamut image.

The second mapping unit 32 color-converts the input image subjected to the automatic image quality correction processing in the second setup unit 30 into an output image suitable for the color gamut of the printing apparatus 24 based on the standard color gamut information of the standard color gamut image and the color gamut information of the printing apparatus 24.

Further, although not illustrated, a configuration in which a third color conversion unit similar to the second color conversion unit is provided and, for example, the second color conversion unit 22 performs color conversion of the input image based on the standard color gamut image having the standard color gamut in sRGB as a standard color space, and the third color conversion unit performs color conversion of the input image based on the standard color gamut image having the standard color gamut in Adobe RGB as a standard color space may be adopted.

Figure 3:
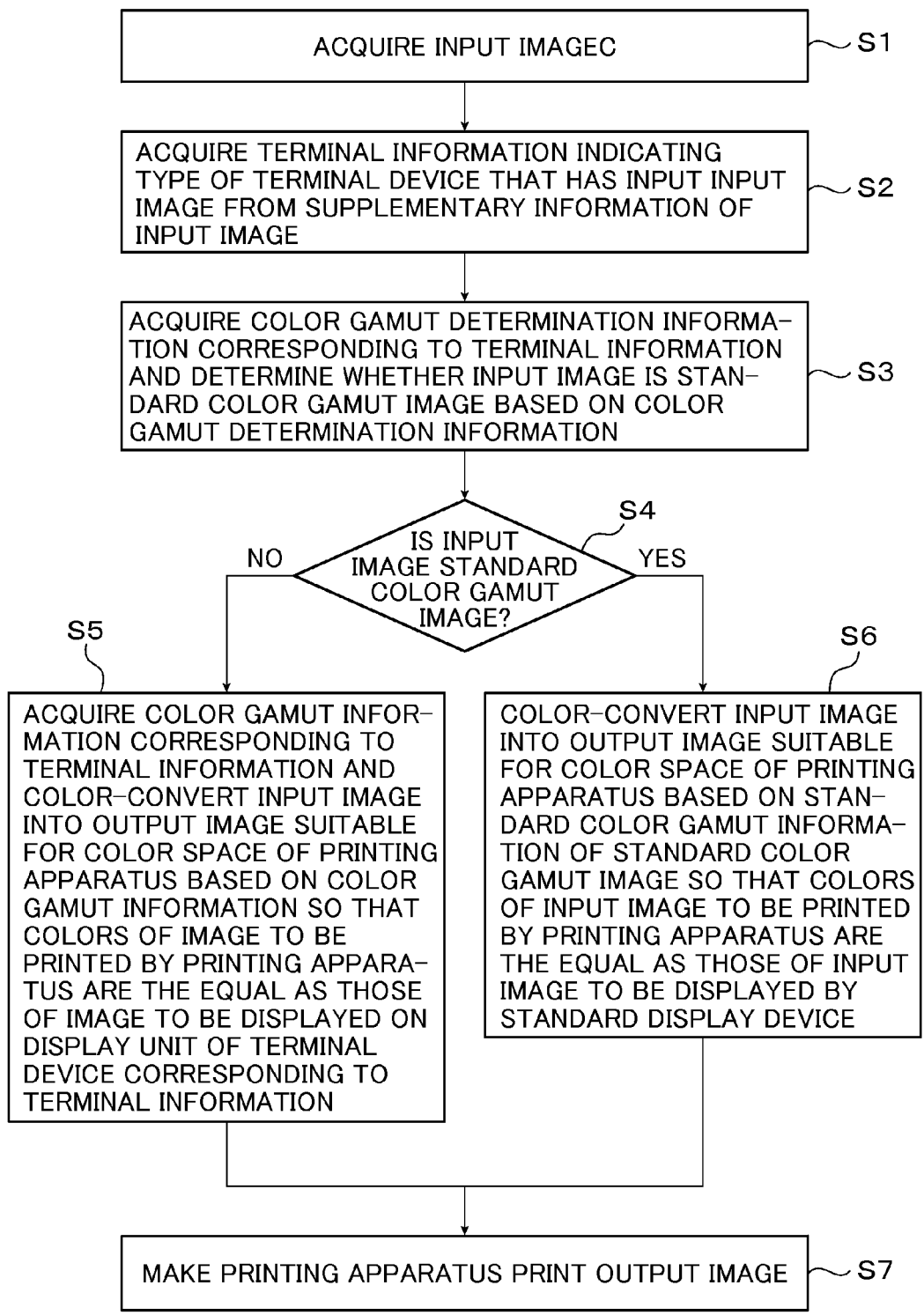
FIG. 3 is a flowchart of an example illustrating an operation of the image processing apparatus shown in FIG. 1.

Next, an operation of the image processing apparatus 10 will be described according to a flowchart shown in FIG. 3.

First, in the image processing apparatus 10, the input image is acquired by the input image acquisition unit 14 (step S1).

Then, the terminal information indicating the type of the terminal device that has input the input image is acquired from the supplementary information of the input image acquired by the terminal information acquisition unit 16 (step S2).

Subsequently, based on the acquired terminal information, the color gamut determination information corresponding to the acquired terminal information is acquired from the color gamut information storage unit 12 by the input image determination unit 18, and then, in this embodiment, based on the acquired color gamut determination information, it is determined whether the input image is a standard color gamut image of sRGB or a non-standard color gamut image that is not the standard color gamut image of sRGB (step S3).

As a result, when the input image is determined to be the non-standard color gamut image (NO in step S4), based on the acquired terminal information, the color gamut information corresponding to the acquired terminal information is acquired from the color gamut information storage unit 12 by the first color conversion unit 20. Then, based on the acquired color gamut information, the input image is color-converted into an output image suitable for the color gamut of the printing apparatus 24 so that the colors of the input image printed by the printing apparatus 24 are the same as those of the input image displayed on the display unit of the terminal device corresponding to the acquired terminal information, by the first color conversion unit 20 (step S5).

On the other hand, when the input image is determined to be a standard color gamut image (YES in step S4), based on the standard color gamut information of the standard color gamut image, the input image is color-converted into an output image suitable for the color gamut of the printing apparatus 24 so that the colors of the input image printed by the printing apparatus 24 are the same as those of the input image displayed by the standard display device, by the second color conversion unit 22 (step S6).

Finally, the output image is printed by the printing apparatus 24 (step S7).

As described above, in the image processing apparatus 10, it is determined whether the input image is a standard color gamut image or a non-standard color gamut image. As a result, in the case where the input image is a non-standard color gamut image, the color conversion is performed so that the colors of the input image printed are the same as the colors of the input image displayed on the display unit of the terminal device, and on the other hand, in the case where the input image is a standard color gamut image, the color conversion is performed so that the colors of the input image printed are the same as the colors of the input image displayed by the standard display device.

Accordingly, in the image processing apparatus 10, since a user can print the image with the same colors as those of the image displayed on the display unit of the terminal device of the user, it is possible to eliminate a sense of incongruity due to the difference in colors between the two images.

In addition, a configuration in which the first color conversion unit 20 or the second color conversion unit 22 is forcibly used to print an image by inputting an instruction through an instruction input unit not illustrated (for example, a touch panel of the terminal device) may be adopted.

Incidentally, a white point of the display unit of the terminal device often differs from a white point of D50/D65 that is a standard light source with a standard color gamut corresponding to a standard color space such as sRGB or Adobe RGB, although there are differences between models or individual differences in the same model.

Figure 4:
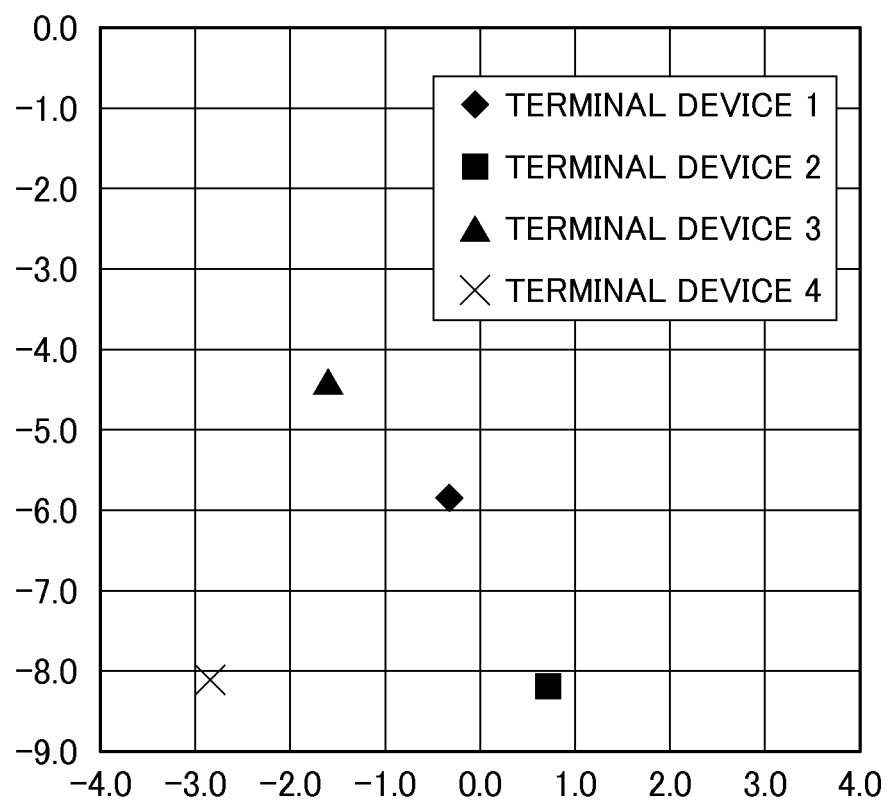
FIG. 4 is a graph of an example illustrating positions of white points of display units of various terminal devices.

FIG. 4 is a graph of an example illustrating positions of white points of display units of various terminal devices. FIG. 4 represents an a*b* plane at the maximum luminance in an L*a*b* color space, with a horizontal axis being an a* axis and a vertical axis being a b* axis. For example, a white point of the standard light source D50 is in a position of the origin, that is, a*=0.0 and b*=0.0. In contrast, it can be seen that white points ♦, ■, ▲, and x of display units of terminal devices 1 to 4 are in positions within an area ranging from about −3 to about 1 of a* and ranging from about −4 to about −8 of b*, and they are thus bluish.

Therefore, it is preferable to perform the color conversion in consideration of the white balance of the image that is displayed on the display unit of the terminal device.

Figure 5:
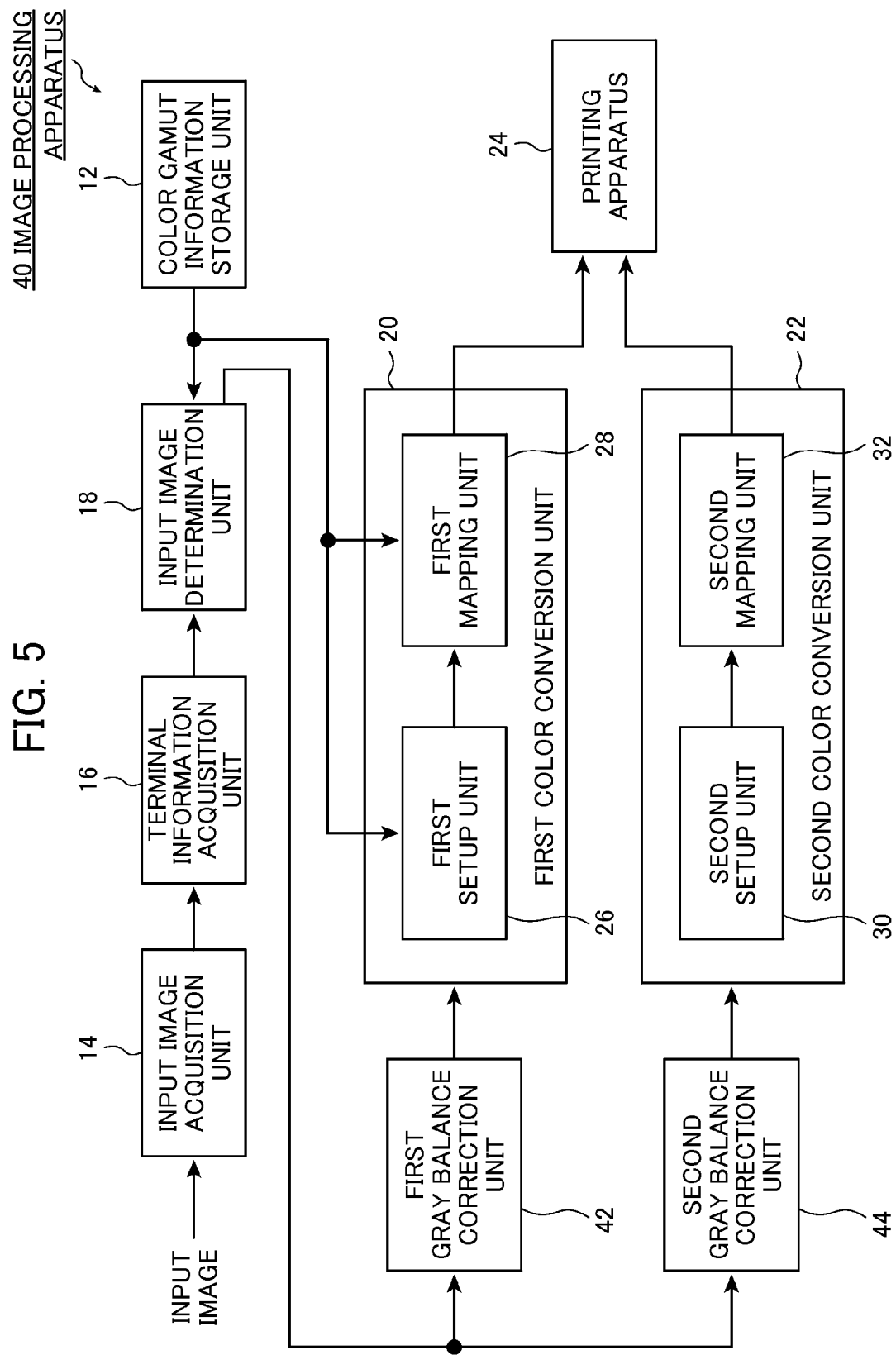
FIG. 5 is a block diagram of a second embodiment illustrating the configuration of the image processing apparatus of the present invention.

FIG. 5 is a block diagram of a second embodiment illustrating the configuration of the image processing apparatus of the present invention. An image processing apparatus 40 shown in FIG. 5 further includes first and second gray balance correction units 42 and 44, as compared with the image processing apparatus 10 of the first embodiment shown in FIG. 1.

Here, in the image processing apparatus 40 of the second embodiment, the components which are the same as those in the image processing apparatus 10 of the first embodiment are denoted by the same reference signs, and repeated description thereon will be omitted.

That is, the image processing apparatus 40 includes the color gamut information storage unit 12, the input image acquisition unit 14, the terminal information acquisition unit 16, the input image determination unit 18, the first and second color conversion units 20 and 22, and the first and second gray balance correction units 42 and 44.

Figure 7:
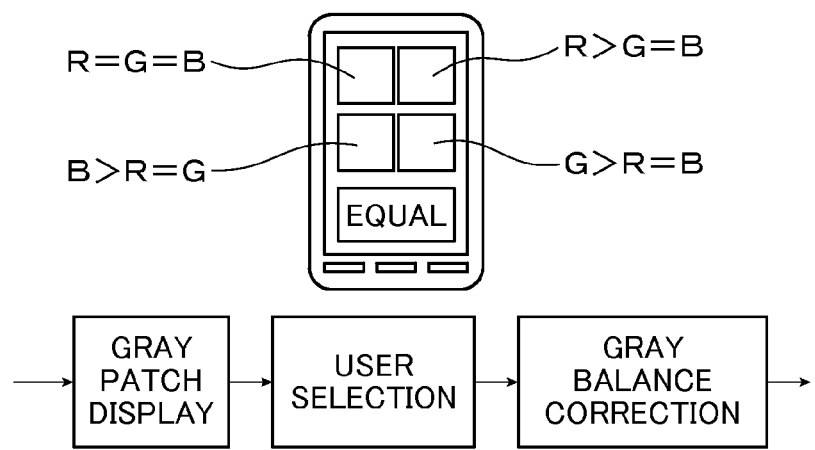
FIG. 7 is a conceptual diagram of an example illustrating a procedure for correcting gray balance.

As shown in FIG. 7, the first and second gray balance correction units 42 and 44 simultaneously display two or more gray patches having different RGB balances on the display unit of the terminal device, and correct the gray balance of the input image, for example, through a matrix operation, based on the RGB balance of one gray patch which is selected by a user from among the two or more gray patches displayed on the display unit of the terminal device. Thereby, it is possible to correct the white balance of the display unit of the terminal device.

Figure 6:
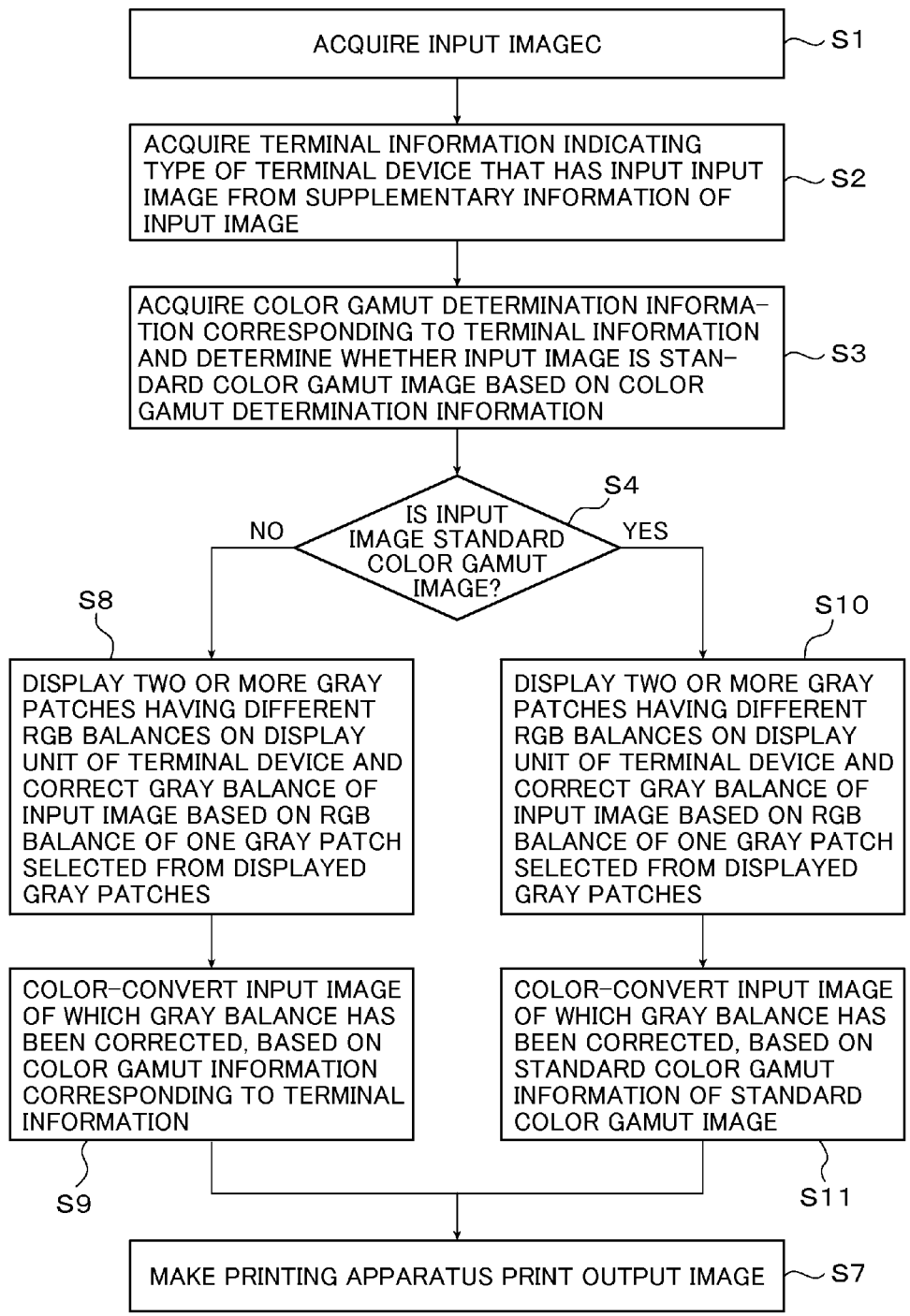
FIG. 6 is a flowchart of an example illustrating an operation of the image processing apparatus shown in FIG. 5.

Next, an operation of the image processing apparatus 40 will be described according to a flowchart shown in FIG. 6.

An operation up to step S4 in the image processing apparatus 40 is the same as that in the image processing apparatus 10.

When the input image is determined to be a non-standard color gamut image (NO in step S4), two or more gray patches having different RGB balances are displayed on the display unit of the terminal device by the first gray balance correction unit 42, and then, based on the RGB balance of one gray patch selected from among the two or more gray patches displayed on the display unit of the terminal device, the gray balance of the input image is corrected by the first gray balance correction unit 42 (step S8).

Then, based on the color gamut information corresponding to the acquired terminal information, color conversion is performed on the input image of which gray balance has been corrected by the first gray balance correction unit 42, by the first color conversion unit 20 (step S9).

On the other hand, when the input image is determined to be a standard color gamut image (YES in step S4), similarly to the above, two or more gray patches having different RGB balances are displayed on the display unit of the terminal device by the second gray balance correction unit 44, and then, based on the RGB balance of one gray patch selected from among the two or more gray patches displayed on the display unit of the terminal device, the gray balance of the input image is corrected by the second gray balance correction unit 44 (step S10).

Then, based on the standard color gamut information of the standard color gamut image, color conversion is performed on the input image of which gray balance has been corrected by the second gray balance correction unit 44, by the second color conversion unit 22 (step S11).

Finally, the output image is printed by the printing apparatus 24 (step S12).

As described above, in the image processing apparatus 40, the two or more gray patches are displayed on the display unit of the terminal device, and the gray balance of the input image is corrected based on the RGB balance of one gray patch selected by the user.

That is, in the image processing apparatus 40, color conversion can be performed in consideration of the white balance of the image displayed on the display unit of the terminal device. In addition, various films (for example, an anti-reflection film, a peep prevention film, and a protective film) are often adhered onto a surface of the display unit of the terminal device and, accordingly, users are accustomed to seeing colors of an image through such films. In the image processing apparatus 40, it is possible to evaluate and correct the grayness in a film-adhered state.

Here, it is not essential to provide the second gray balance correction unit 44.

Next, a specific procedure for correcting the gray balance will be described with reference to FIGS. 8 to 12.

Figure 8:
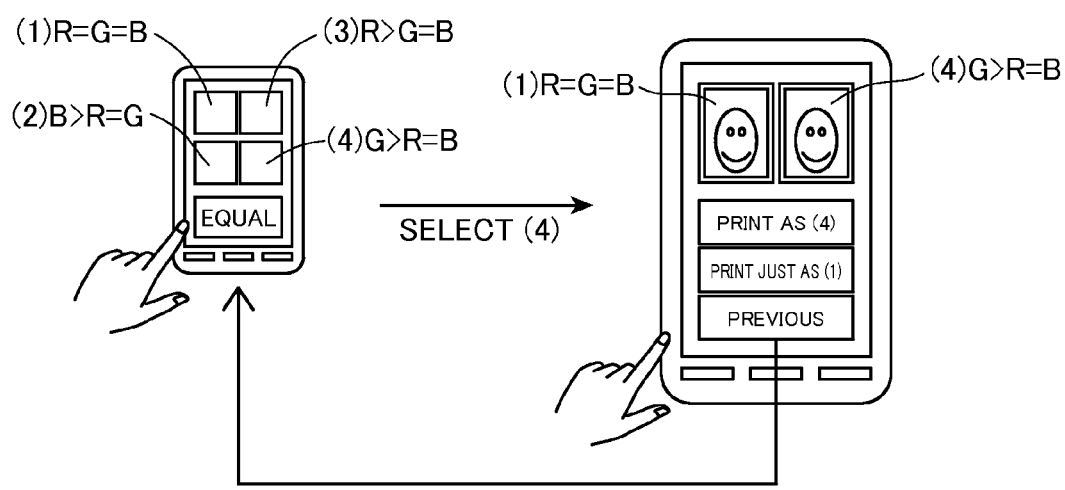
FIG. 8 is a conceptual diagram of an example illustrating a procedure for correcting gray balance.

In the example shown in FIG. 8, a configuration in which four gray patches having different RGB balances are simultaneously displayed is adopted.

In this example, as shown in a left part of FIG. 8, four gray patches including a first gray patch (1) of R=G=B, a second gray patch (2) of B>R=G, a third gray patch (3) of R>G=B, and a fourth gray patch (4) of G>R=B are simultaneously displayed as a gray patch selection screen on the display unit of the terminal device by the first gray balance correction unit 42.

That is, the first gray balance correction unit 42 simultaneously displays, as the gray patch selection screen, two or more gray patches including the first gray patch whose RGB balance is such that the R, G and B values are equal to one another and one or more second gray patches (corresponding to the second to fourth gray patches described above) each having an RGB balance different from that of the first gray patch on the display unit of the terminal device.

Here, it is preferable that the color difference between the B value and the R value or G value of the second gray patch (2) be about 1 to 3. The same applies to the color differences of the third and fourth gray patches (3) and (4).

In this example, the four gray patches (1) to (4) are displayed in matrix form, by two in row and column directions, and a button marked as "Equal" is displayed on their lower side.

A method of displaying the four gray patches (1) to (4) is not limited to the above and, for example, the four gray patches (1) to (4) may be displayed side by side in one horizontal row (row direction) or as aligned in one vertical column (column direction).

Then, one gray patch which is considered (seen) the grayest by the user is selected from among the four gray patches (1) to (4) by the user.

In this example, it is assumed that, from among the four gray patches (1) to (4) displayed on the display unit (touch panel) of the terminal device, the user touches the fourth gray patch (4) with the finger to select the fourth gray patch (4).

Then, as shown in a right part of FIG. 8, two gray patches including the first and fourth gray patches (1) and (4) are displayed as a gray patch confirmation screen by the first gray balance correction unit 42.

In this example, the two gray patches (1) and (4) are displayed side by side in one horizontal row (row direction), and buttons marked as "Print as (4)," "Print just as (1)," and "Previous" are displayed on the lower side of the gray patches.

Here, it is not essential to display the gray patch confirmation screen.

Then, one gray patch which is considered the grayest by the user is selected from the two gray patches (1) and (4) of the confirmation screen by the user.

In this example, when the fourth gray patch (4) is selected by the user touching the button marked as "Print as (4)" with the finger, the gray balance of the input image is corrected based on the RGB balance of the fourth gray patch (4) by the first gray balance correction unit 42.

In contrast, when the first gray patch (1) is selected by the user touching the button marked as "Print just as (1)" with the finger, the gray balance of the input image is not corrected.

In addition, when the user touches the button marked as "Previous" with the finger to select it, the screen returns to the selection screen as shown in the left part of FIG. 8 and the selection of gray patch can be performed again.

When the second or third gray patch (2) or (3) of the selection screen is selected, the first gray balance correction unit 42 operates as in the case where the fourth gray patch (4) is selected.

In addition, when the first gray patch (1) or the button marked as "Equal" is selected, the gray balance of the input image is not corrected.

That is, in this example, in the case where the confirmation screen is not displayed, the first gray balance correction unit 42 corrects the gray balance of the input image when any gray patch other than the first gray patch (1) is selected from among the four gray patches (1) to (4).

In the case where the confirmation screen is displayed, when one gray patch other than the first gray patch (1) is selected from among the four gray patches (1) to (4) of the selection screen, the first gray balance correction unit 42 simultaneously displays, as the confirmation screen, two gray patches including the first gray patch (1) and the one gray patch selected from among the four gray patches (1) to (4) on the display unit of the terminal device, and when the one gray patch selected from among the four gray patches (1) to (4) is selected from the two gray patches again, the first gray balance correction unit 42 corrects the gray balance of the input image.

In the confirmation screen as shown in the right part of FIG. 8, two gray patches each containing a facial image are displayed as the two gray patches (1) and (4).

There is an advantage in displaying the gray patches containing the facial image because it is easy for the user to perform grayness comparison.

Here, it is not essential to display the gray patches containing the facial image in the confirmation screen. The gray patches containing the facial image may be displayed in the selection screen.

Figure 9:
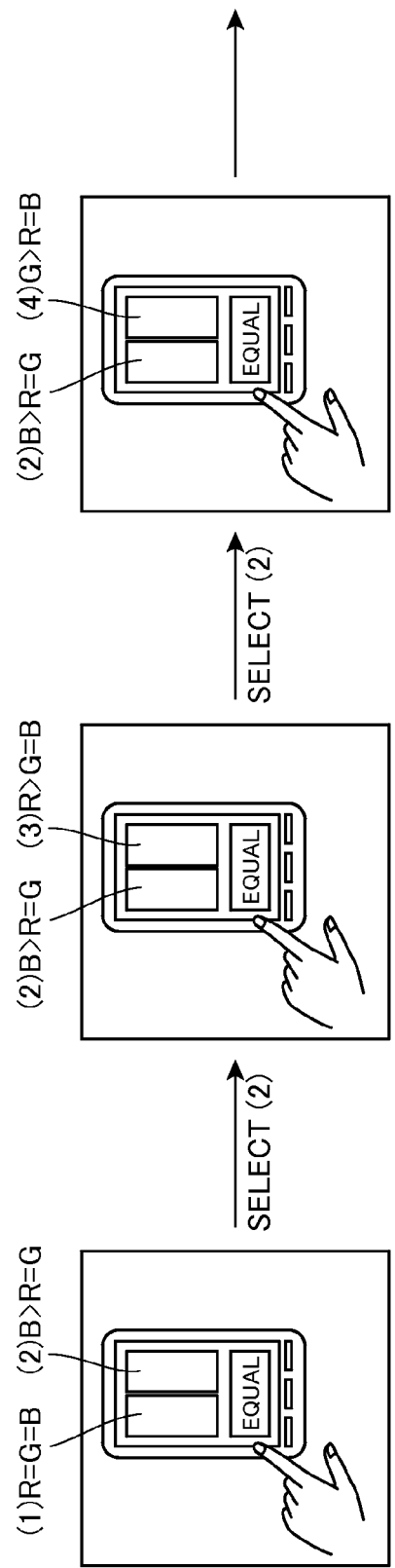
FIG. 9 is a conceptual diagram of an example illustrating a procedure for correcting gray balance.

In the example shown in FIG. 9, a configuration in which two gray patches out of the four gray patches (1) to (4) are simultaneously displayed is adopted.

In this example, as shown in a left part of FIG. 9, two gray patches including the first and second gray patches (1) and (2) out of the four gray patches (1) to (4) are simultaneously displayed as a first selection screen on the display unit of the terminal device by the first gray balance correction unit 42.

In this example, the first and second gray patches (1) and (2) are displayed side by side in one horizontal row.

One gray patch which is considered the grayest by the user is selected from the two gray patches (1) and (2) by the user.

In this example, the second gray patch (2) is assumed to have been selected from the two gray patches (1) and (2).

There is an advantage in selecting one gray patch from the two gray patches (1) and (2) rather than the four gray patches (1) to (4) because it is easy for the user to perform grayness comparison.

Then, as shown in a central part of FIG. 9, two gray patches including the second and third gray patches (2) and (3) are simultaneously displayed as a second selection screen on the display unit of the terminal device by the first gray balance correction unit 42.

In this example, similarly to the first selection screen, the two gray patches (2) and (3) are displayed side by side in one horizontal row.

Then, one gray patch which is considered the grayest by the user is selected from the two gray patches (2) and (3) by the user.

In this example, the second gray patch (2) is assumed to have been selected from the two gray patches (2) and (3).

Then, as shown in a right part of FIG. 9, two gray patches including the second and fourth gray patches (2) and (4) are simultaneously displayed as a third selection screen on the display unit of the terminal device by the first gray balance correction unit 42.

In this example, similarly to the first and second selection screens, the two gray patches (2) and (4) are displayed side by side in one horizontal row.

Then, one gray patch which is considered the grayest by the user is selected from the two gray patches (2) and (4) by the user.

In this example, if the second gray patch (2) is selected from the two gray patches (2) and (4), the gray balance of the input image is corrected based on the RGB balance of the second gray patch (2) by the first gray balance correction unit 42.

In contrast, if the fourth gray patch (4) is selected, the gray balance of the input image is corrected based on the RGB balance of the fourth gray patch (4) by the first gray balance correction unit 42.

The order in which the second, third and fourth gray patches are displayed in each selection screen is not limited at all. For example, when the third gray patch (3) is displayed in the third selection screen and selected, the first gray balance correction unit 42 corrects the gray balance of the input image based on the RGB balance of the third gray patch (3).

When the first gray patch is selected in any of the selection screens, the subsequent selection screen or screens are not displayed and the gray balance of the input image is not corrected.

In addition, the button marked as "Equal" is displayed on the lower side of the gray patches in each selection screen. When the user touches the button marked as "Equal" in any of the selection screens with the finger to select it, the gray balance of the input image is not corrected.

That is, in this example, the first gray balance correction unit 42 simultaneously displays, as the selection screen, two gray patches including the first gray patch and one gray patch out of one or more second gray patches (corresponding to the second to fourth gray patches described above) each having an RGB balance different from that of the first gray patch on the display unit of the terminal device.

Then, when the gray patch other than the first gray patch (1) is selected from the two gray patches, the first gray balance correction unit 42 simultaneously displays two gray patches including the gray patch selected from the former two gray patches and one gray patch not displayed yet on the display unit of the terminal device out of the three gray patches (2) to (4) on the display unit of the terminal device, and repetitively performs such simultaneous displaying until all of the three gray patches (2) to (4) are displayed on the display unit of the terminal device.

Then, the first gray balance correction unit 42 corrects the gray balance of the input image based on the RGB balance of one gray patch selected from the two gray patches out of the three gray patches (2) to (4) that are finally and simultaneously displayed on the display unit of the terminal device.

After the two gray patches are finally and simultaneously displayed on the display unit of the terminal device, the confirmation screen may be displayed as in the example of FIG. 8, and two gray patches each containing a facial image may be displayed as the two gray patches of each of the selection screens and confirmation screen.

In the case where the confirmation screen is displayed, after one gray patch is selected from the two gray patches out of the three gray patches (2) to (4) that are finally and simultaneously displayed on the display unit of the terminal device, the first gray balance correction unit 42 simultaneously displays, as the confirmation screen, two gray patches including the first gray patch (1) and the one gray patch selected from the two gray patches out of the three gray patches (2) to (4) that are finally and simultaneously displayed on the display unit of the terminal device, on the display unit of the terminal device.

Then, the first gray balance correction unit 42 corrects the gray balance of the input image when, in the confirmation screen, the one gray patch selected from the two gray patches out of the three gray patches (2) to (4) that are finally and simultaneously displayed on the display unit of the terminal device is selected again from the two gray patches including the first gray patch (1) and the one gray patch selected from the two gray patches out of the three gray patches (2) to (4) that are finally and simultaneously displayed on the display unit of the terminal device.

In the example shown in FIG. 10, a configuration in which a detailed gray patch selection screen can be displayed subsequently to each of the selection screens in the example of FIG. 9 is adopted.

Figure 10:
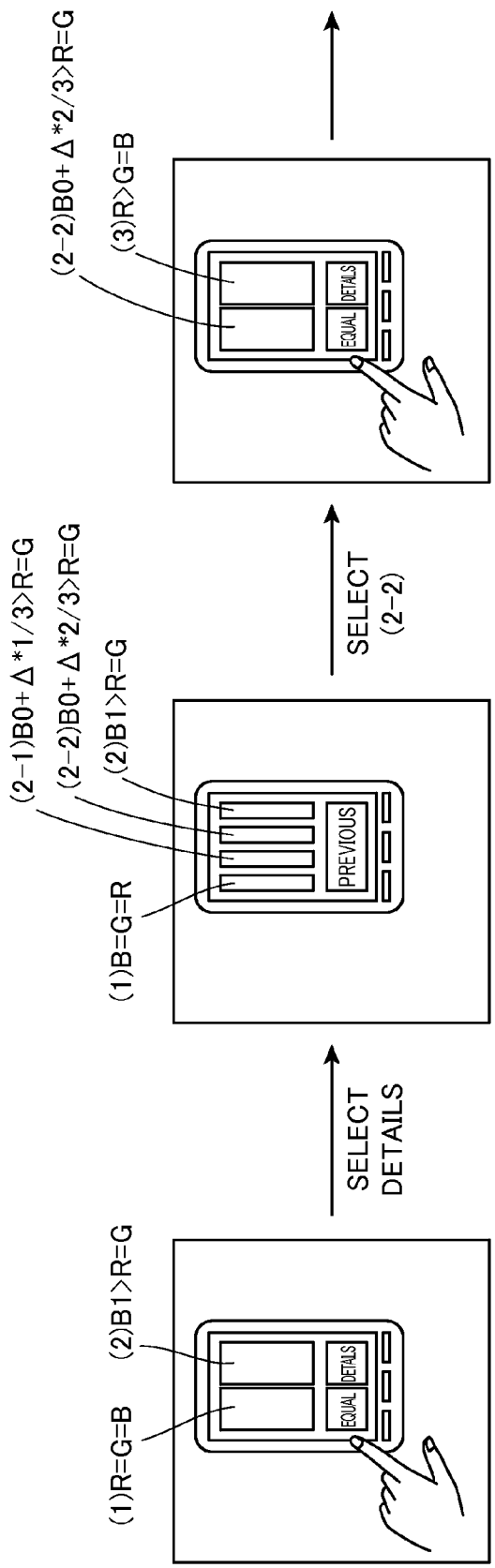
FIG. 10 is a conceptual diagram of an example illustrating a procedure for correcting gray balance.

In this example, as shown in a left part of FIG. 10, two gray patches including the first and second gray patches (1) and (2) are simultaneously displayed as a first selection screen on the display unit of the terminal device by the first gray balance correction unit 42.

In this example, the first and second gray patches (1) and (2) are displayed side by side in one horizontal row, and buttons marked as "Equal" and "Details" are displayed side by side in one horizontal row on the lower side of the gray patches.

For convenience in making the following description, the second gray patch (2) is defined to have an RGB balance of B1>R=G.

It is assumed that the user has touched the button marked as "Details" with the finger to select it.

Then, as shown in a central part of FIG. 10, four gray patches including the first gray patch (1), the second gray patch (2), a $(2\text{-}1)^{th}$ gray patch (2-1) of B0+Δ*1/3>R=G, and a $(2\text{-}2)^{th}$ gray patch (2-2) of B0+Δ*2/3>R=G are simultaneously displayed as a first detailed selection screen on the display unit of the terminal device.

Here, Δ=B1-B0. It is preferable for Δ, that is, a color difference between a B1 value and a B0 value to be about 0.5 to 1. The same applies to the color differences Δ of the third and fourth gray patches (3) and (4).

In this example, the four gray patches (1), (2), (2-1) and (2-2) are displayed side by side in one horizontal row, and a button marked as "Previous" is displayed on their lower side.

Then, one gray patch which is considered the grayest by the user is selected from among the four gray patches (1), (2), (2-1) and (2-2) by the user.

In this example, the $(2\text{-}2)^{th}$ gray patch (2-2) is assumed to have been selected by the user.

Then, as shown in a right part of FIG. 10, two gray patches including the $(2\text{-}2)^{th}$ and third gray patches (2-2) and (3) are simultaneously displayed, as a second selection screen, on the display unit of the terminal device by the first gray balance correction unit 42.

In this example, similarly to the above first selection screen, the two gray patches (2-2) and (3) are displayed side by side in one horizontal row, and buttons marked as "Equal" and "Details" are displayed side by side in one horizontal row on the lower side of the gray patches.

Then, the above operation is repetitively performed until all of the three gray patches (2) to (4) are displayed on the display unit of the terminal device.

When the second or $(2\text{-}1)^{th}$ gray patch (2) or (2-1) is selected in the first detailed selection screen, the first gray balance correction unit 42 operates as in the case where the $(2\text{-}2)^{th}$ gray patch (2-2) is selected.

In contrast, when the first gray patch (1) is selected, the second and subsequent selection screens are not displayed, and the gray balance of the input image is not corrected.

In addition, when the button marked as "Previous" is selected, the screen returns to the first selection screen shown in the left part of FIG. 10.

That is, in this example, when an instruction to display the detailed gray patch selection screen is input after two gray patches are simultaneously displayed as a selection screen on the display unit of the terminal device, the first gray balance correction unit 42 simultaneously displays, as the detailed gray patch selection screen, three or more gray patches including the above two gray patches and one or more gray patches in which the B, R or G value is different from that in the second, third or fourth gray patch (2), (3) or (4) as included in the two gray patches on the display unit of the terminal device.

Then, when a gray patch other than the first gray patch (1) is selected from among the three or more gray patches, the first gray balance correction unit 42 displays, as a next selection screen, two gray patches including the gray patch selected from among the three or more gray patches and one gray patch not displayed yet on the display unit of the terminal device out of the three gray patches (2) to (4).

Figure 11:
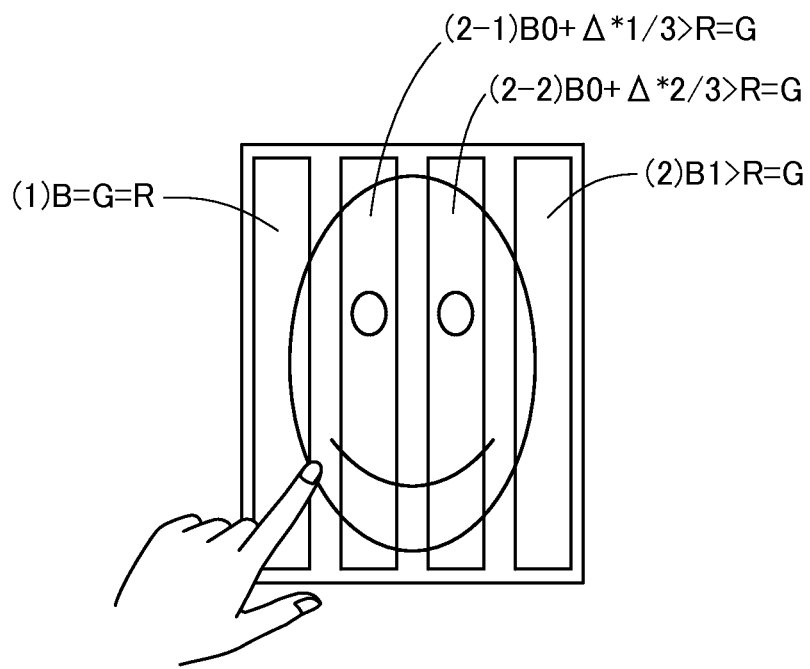
FIG. 11 is a conceptual diagram of an example illustrating a procedure for correcting gray balance.

As the four gray patches (1), (2), (2-1) and (2-2) of the first detailed selection screen shown in the central part of FIG. 10, the first gray balance correction unit 42 may display four gray patches (1), (2), (2-1) and (2-2) containing one facial image which is divided among the four gray patches (1), (2), (2-1) and (2-2), as shown in FIG. 11. The same applies to the second and third detailed selection screens that can be displayed after the second and third selection screens, respectively.

In addition, when an instruction to display the detailed gray patch selection screen is input after two gray patches are simultaneously displayed as a selection screen on the display unit of the terminal device, the first gray balance correction unit 42 may repeat a simultaneous display of two gray patches as a detailed selection screen on the display unit of the terminal device, with the latter two gray patches including the first gray patch (1) and one gray patch out of two or more gray patches that include the second, third or fourth gray patch (2), (3) or (4) as included in the former two gray patches and one or more gray patches, in each of which the B, R or G value is different from that in the second, third or fourth gray patch (2), (3) or (4) as included in the former two gray patches, until the first, second, third or fourth gray patch (1), (2), (3) or (4) is selected or all of the above two or more gray patches are displayed on the display unit of the terminal device, so as to allow the selection of a gray patch.

Figure 12:
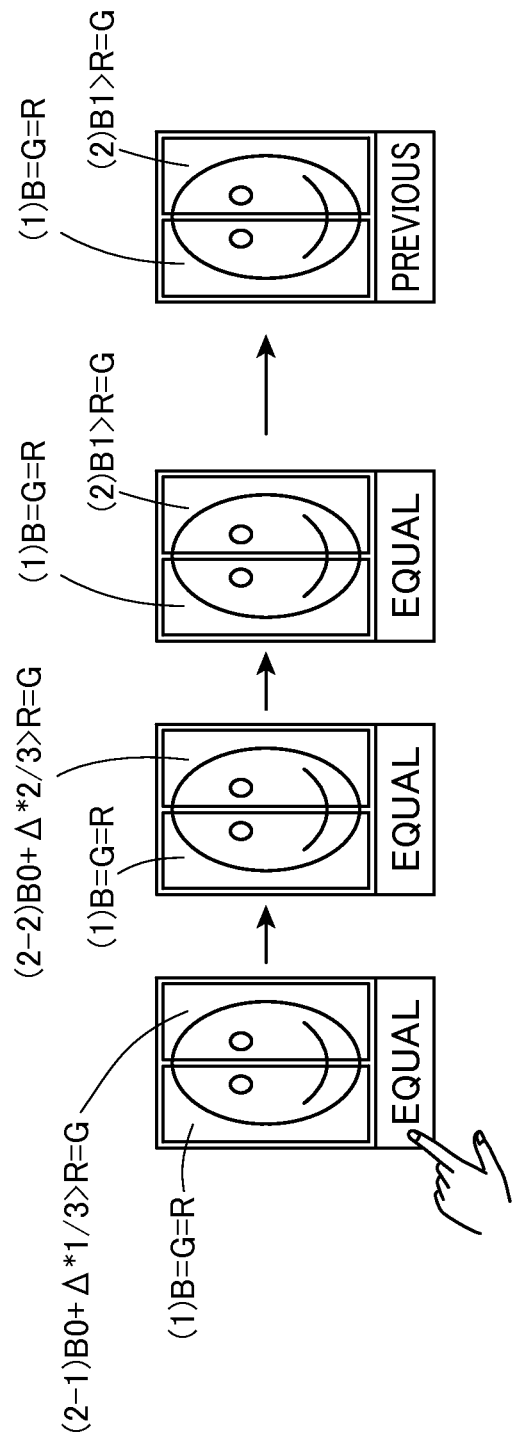
FIG. 12 is a conceptual diagram of an example illustrating a procedure for correcting gray balance.

For example, as shown in FIG. 12, two gray patches including the first and $(2\text{-}1)^{th}$ gray patches (1) and (2-1) are displayed as a first detailed selection screen.

Then, when a button marked as "Equal" is selected, two gray patches including the first and $(2\text{-}2)^{th}$ gray patches (1) and (2-2) are displayed as a second detailed selection screen.

Then, when the button marked as "Equal" is selected, two gray patches including first and second gray patches (1) and (2) are displayed as a third detailed selection screen.

When the first, $(2\text{-}1)^{th}$, $(2\text{-}2)^{th}$ or second gray patch (1), (2-1), (2-2) or (2) is selected in any of the detailed selection screens, no subsequent detailed selection screens are displayed.

In addition, when the gray patch other than the first gray patch (1) is selected from the two gray patches of any of the detailed selection screens, the two gray patches of the detailed selection screen in which the gray patch other than the first gray patch (1) has been selected may be simultaneously displayed as a confirmation screen on the display unit of the terminal device, as shown in FIG. 12.

In the example of FIG. 12, when the second gray patch (2) is selected in the third detailed selection screen, the two gray patches (1) and (2) including the first and second gray patches (1) and (2) are displayed as the confirmation screen.

When two gray patches including the first and $(2\text{-}1)^{th}$ gray patches (1) and (2-1) are displayed, similarly to the above, two gray patches containing one facial image which is divided between the two gray patches (1) and (2-1) may be displayed, as shown in FIG. 12. The same applies to the two gray patches of each of the second and third detailed selection screens and confirmation screen.

The color gamut of the image that is displayed on the display unit of the terminal device varies depending on the luminance of the display unit. Therefore, it is preferable to perform color conversion of the input image in accordance with the luminance of the display unit.

While the first color conversion unit 20 color-converts the input image so that the colors of the input image printed by the printing apparatus are the same as those of the input image displayed on the display unit of the terminal device corresponding to the acquired terminal information at the luminance set for the display unit of the terminal device corresponding to the acquired terminal information, for example, a configuration in which the input image is color-converted at the maximum luminance settable for the display unit of the terminal device corresponding to the acquired terminal information or at a luminance of 100 to 120 candelas per square meter that is a standard luminance of the conventional display device may be adopted.

Each of the configurations of the color gamut information storage unit 12, the input image acquisition unit 14, the terminal information acquisition unit 16, the input image determination unit 18, the first and second color conversion units 20 and 22, the first and second setup units 26 and 30, the first and second mapping units 28 and 32, and the first and second gray balance correction units 42 and 44 is not limited at all, and various configurations capable of realizing the same functions as those of the respective components of the above-mentioned embodiments can be adopted.

The method of the present invention can be implemented using, for instance, a program for causing a computer to execute the respective steps of the method. Further, a computer-readable recording medium having the program recorded thereon can be provided.

The present invention is basically configured as above.

While the present invention has been described in detail, it is needless to say that the present invention is not limited to the above-mentioned embodiments, but may be improved or modified in various forms within a scope that does not depart from the gist of the present invention.

What is claimed is:

1. An image processing apparatus, comprising:
a color gamut information storage unit implemented by a programmed computer and configured to store terminal information indicating a type of one or more terminal devices, color gamut determination information indicating whether a color gamut of a display unit of each corresponding terminal device is a standard color gamut or a non-standard color gamut that is not the standard color gamut, and color gamut information indicating a color gamut of the display unit of each corresponding terminal device in association with one another;
an input image acquisition unit implemented by the programmed computer and configured to acquire an input image;
a terminal information acquisition unit implemented by the programmed computer and configured to acquire terminal information indicating the type of a terminal device that has input the input image;
an input image determination unit implemented by the programmed computer and configured to acquire the color gamut determination information stored in association with the terminal information acquired by the terminal information acquisition unit from the color gamut information storage unit based on the acquired terminal information, and determine whether the input image is a standard color gamut image of the standard color gamut or a non-standard color gamut image of the non-standard color gamut based on the acquired color gamut determination information;
a first color conversion unit implemented by the programmed computer and configured to convert the input image as determined to be the non-standard color gamut image into an output image suitable for a color gamut of a printing apparatus by acquiring the color gamut information stored in association with the acquired terminal information from the color gamut information storage unit based on the acquired terminal information and performing color conversion of the input image based on the acquired color gamut information so that the input image printed by the printing apparatus may be equal in color to the input image displayed on the display unit of the terminal device corresponding to the acquired terminal information; and
a first gray balance correction unit implemented by the programmed computer and configured to simultaneously display a first set of two or more gray patches having different RGB balances on the display unit of the terminal device, and correct a gray balance of the input image based on the RGB balance of one gray patch selected from the first set of two or more gray patches,
wherein the first color conversion unit is configured to perform color conversion of the input image whose gray balance has been corrected by the first gray balance correction unit, and
wherein the first gray balance correction unit is configured to simultaneously display, as a gray patch selection screen, a second pair of gray patches including a first gray patch whose RGB balance is such that R, G and B values are equal to one another and one gray patch out of one or more second gray patches each having an RGB balance different from that of the first gray patch on the display unit of the terminal device and, when the gray patch other than the first gray patch is selected from the second pair of gray patches, simultaneously display a third pair of gray patches including the gray patch selected from the second pair of gray patches and one gray patch out of the second gray patches that is not displayed yet on the display unit of the terminal device in a repeated manner until all of the second gray patches are displayed on the display unit of the terminal device, so as to correct the gray balance of the input image based on the RGB balance of one gray patch out of the second gray patches that is selected from the third pair of gray patches as finally simultaneously displayed on the display unit of the terminal device.

2. The image processing apparatus according to claim 1, wherein the first gray balance correction unit is configured to simultaneously display, as a gray patch selection screen, a second set of two or more gray patches including a first gray patch whose RGB balance is such that R, G and B values are equal to one another and one or more second gray patches each having an RGB balance different from that of the first gray patch on the display unit of the terminal device, and correct the gray balance of the input image when a gray patch other than the first gray patch is selected from the second set of two or more gray patches.

3. The image processing apparatus according to claim 2, wherein, when a gray patch other than the first gray patch is selected from the second set of two or more gray patches in the gray patch selection screen, the first gray balance correction unit is configured to simultaneously display, as a gray patch confirmation screen, a first pair of gray patches including the first gray patch and the gray patch selected from the second set of two or more gray patches on the display unit of the terminal device, and correct the gray balance of the input image when the gray patch selected from the second set of two or more gray patches is selected again from the first pair of gray patches.

4. The image processing apparatus according to claim 3, wherein the first gray balance correction unit is configured to display two gray patches each containing a facial image as the first pair of gray patches.

5. The image processing apparatus according to claim 1, wherein, after one gray patch out of the second gray patches is selected from the third pair of gray patches as finally simultaneously displayed on the display unit of the terminal device, the first gray balance correction unit is configured to simultaneously display, as a gray patch confirmation screen, a fourth pair of gray patches including the first gray patch and the one gray patch out of the second gray patches, which is selected from the third pair of gray patches as finally simultaneously displayed on the display unit of the terminal device, on the display unit of the terminal device, and correct the gray balance of the input image when the one gray patch out of the second gray patches, which is selected from the third pair of gray patches as finally simultaneously displayed on the display unit of the terminal device is selected again from the fourth pair of gray patches.

6. The image processing apparatus according to claim 5, wherein the first gray balance correction unit is configured to display two gray patches each containing a facial image as the fourth pair of gray patches.

7. The image processing apparatus according to claim 1, wherein, when an instruction to display a detailed gray patch selection screen is input after the second pair of gray patches are simultaneously displayed on the display unit of the terminal device as the gray patch selection screen, the first gray balance correction unit is configured to simultaneously display, as the detailed gray patch selection screen, three or more gray patches including the second pair of gray patches and one or more gray patches each having a B, R or G value different from that of the second gray patch in the second pair of gray patches on the display unit of the terminal device and, when a gray patch other than the first gray patch is selected from among the three or more gray patches, display, as a next selection screen, two gray patches including the gray patch selected from among the three or more gray patches and one gray patch out of the second gray patches that is not displayed yet on the display unit of the terminal device.

8. The image processing apparatus according to claim 7, wherein the first gray balance correction unit is configured to display four or more gray patches containing one facial image which is divided among the four or more gray patches as four or more gray patches including the first gray patch and the three or more gray patches.

9. The image processing apparatus according to claim 1, wherein, when an instruction to display a detailed gray patch selection screen is input after the second pair of gray patches are simultaneously displayed on the display unit of the terminal device as the gray patch selection screen, the first gray balance correction unit is configured to simultaneously display, as the detailed gray patch selection screen, a fifth pair of gray patches including the first gray patch and one gray patch out of a third set of two or more gray patches including the second gray patch in the second pair of gray patches and one or more gray patches each having a B, R or G value different form that of the second gray patch in the second pair of gray patches on the display unit of the terminal device in a repeated manner until the one gray patch out of the third set of two or more gray patches is selected or all of the third set of two or more gray patches are displayed on the display unit of the terminal device and, when the gray patch other than the first gray patch is selected from any fifth pair of gray patches as the detailed gray patch selection screen, simultaneously display, as a gray patch confirmation screen, the fifth pair of gray patches as the detailed gray patch selection screen, from which the gray patch other than the first gray patch is selected, on the display unit of the terminal device.

10. The image processing apparatus according to claim 9, wherein the first gray balance correction unit is configured to display two gray patches containing one facial image which is divided between the two gray patches as the fifth pair of gray patches.

11. The image processing apparatus according to claim 1, further comprising:
a second color conversion unit implemented by the programmed computer and configured to convert the input image as determined to be the standard color gamut image into an output image suitable for the color gamut of the printing apparatus by performing color conversion of the input image based on standard color gamut information of the standard color gamut image so that the input image printed by the printing apparatus may be equal in color to the input image displayed by a standard display device having the standard color gamut.

12. The image processing apparatus according to claim 11, further comprising:
a second gray balance correction unit implemented by the programmed computer and configured to simultaneously display a fourth set of two or more gray patches having different RGB balances on the display unit of the terminal device, and correct a gray balance of the input image based on the RGB balance of one gray patch selected from the fourth set of two or more gray patches,
wherein the second color conversion unit is configured to perform color conversion of the input image whose gray balance has been corrected by the second gray balance correction unit.

13. The image processing apparatus according to claim 11, further comprising:
a third color conversion unit implemented by the programmed computer and configured to convert the input image as determined to be the standard color gamut image into an output image suitable for the color gamut of the printing apparatus by performing color conversion of the input image based on standard color gamut information of the standard color gamut image so that the input image printed by the printing apparatus may be equal in color to the input image displayed by a standard display device having the standard color gamut, wherein the second color conversion unit is configured to perform color conversion of the input image based on a standard color gamut image having a standard color gamut in sRGB as a standard color space, and wherein the third color conversion unit is configured to perform color conversion of the input image based on a standard color gamut image having a standard color gamut in Adobe RGB as a standard color space.

14. The image processing apparatus according to claim 1, wherein the first color conversion unit is configured to perform color conversion of the input image so that the input image printed by the printing apparatus may be equal in color to the input image displayed on the display unit of the terminal device corresponding to the acquired terminal information, at a luminance set for the display unit of the terminal device corresponding to the acquired terminal information.

15. An image processing apparatus, comprising:
a color gamut information storage unit implemented by the programmed computer and configured to store terminal information indicating a type of one or more terminal devices, color gamut determination information indicating whether a color gamut of a display unit of each corresponding terminal device is a standard color gamut or a non-standard color gamut that is not the standard color gamut, and color gamut information indicating a color gamut of the display unit of each corresponding terminal device in association with one another;
an input image acquisition unit implemented by the programmed computer and configured to acquire an input image;
a terminal information acquisition unit implemented by the programmed computer and configured to acquire terminal information indicating the type of a terminal device that has input the input image;
an input image determination unit implemented by the programmed computer and configured to acquire the color gamut determination information stored in association with the terminal information acquired by the terminal information acquisition unit from the color gamut information storage unit based on the acquired terminal information, and determine whether the input image is a standard color gamut image of the standard color gamut or a non-standard color gamut image of the non-standard color gamut based on the acquired color gamut determination information; and
a first color conversion unit implemented by the programmed computer and configured to convert the input image as determined to be the non-standard color gamut image into an output image suitable for a color gamut of a printing apparatus by acquiring the color gamut information stored in association with the acquired terminal information from the color gamut information storage unit based on the acquired terminal information and performing color conversion of the input image based on the acquired color gamut information so that the input image printed by the printing apparatus may be equal in color to the input image displayed on the display unit of the terminal device corresponding to the acquired terminal information,
wherein the first color conversion unit is configured to perform color conversion of the input image so that the input image printed by the printing apparatus may be equal in color to the input image displayed on the display unit of the terminal device corresponding to the acquired terminal information, at a maximum luminance settable for the display unit of the terminal device corresponding to the acquired terminal information.

16. An image processing method, comprising the steps of:
acquiring an input image by an input image acquisition unit;
acquiring, by a terminal information acquisition unit, terminal information indicating a type of a terminal device that has input the input image;
acquiring, by an input image determination unit, color gamut determination information from a color gamut information storage unit based on the terminal information acquired by the terminal information acquisition unit, with the color gamut determination information indicating whether a color gamut of a display unit of a terminal device corresponding to the acquired terminal information is a standard color gamut or a non-standard color gamut that is not the standard color gamut and being stored in association with the acquired terminal information, so as to determine, by the input image determination unit, whether the input image is a standard color gamut image of the standard color gamut or a non-standard color gamut image of the non-standard color gamut based on the acquired color gamut determination information; and
converting the input image as determined to be the non-standard color gamut image into an output image suitable for a color gamut of a printing apparatus by a first color conversion unit which acquires color gamut information from the color gamut information storage unit based on the terminal information acquired by the terminal information acquisition unit, with the color gamut information indicating the color gamut of the display unit of the terminal device corresponding to the acquired terminal information and being stored in association with the acquired terminal information, so as to perform color conversion of the input image based on the acquired color gamut information so that the input image printed by the printing apparatus may be equal in color to the input image displayed on the display unit of the terminal device corresponding to the acquired terminal information,
wherein the color gamut determination information is obtained by comparing a shape and a size of the color gamut of the display unit of each of the terminal device with a shape and a size of the standard color gamut of the standard color gamut image based on the color gamut information of the display unit of each of the terminal device and standard color gamut information of the standard color gamut image.

17. The image processing method according to claim 16, further comprising the step of:
converting the input image as determined to be the standard color gamut image into an output image suitable for the color gamut of the printing apparatus by a second color conversion unit which performs color conversion of the input image based on standard color gamut information of the standard color gamut image so that the input image printed by the printing apparatus may be equal in color to the input image displayed by a standard display device having the standard color gamut.

18. The image processing method according to claim 16, further comprising the step of:
- simultaneously displaying, by a first gray balance correction unit, a first set of two or more gray patches having different RGB balances on the display unit of the terminal device and correcting, by the first gray balance correction unit, a gray balance of the input image based on the RGB balance of one gray patch selected from the first set of two or more gray patches,
- wherein the first color conversion unit performs color conversion of the input image whose gray balance has been corrected by the first gray balance correction unit.

19. A non-transitory computer-readable recording medium having a program recorded thereon to cause a computer to execute the respective steps of the image processing method according to claim 16.

* * * * *